July 23, 1968 R. E. GROSFILLEX 3,393,941
ARTICLE FOR SEATING FURNITURE
Filed Feb. 6, 1967 2 Sheets-Sheet 1

United States Patent Office 3,393,941
Patented July 23, 1968

3,393,941
ARTICLE FOR SEATING FURNITURE
Raymond E. Grosfillex, Arbent, Ain, France, assignor to Societe a Responsabilite Limitee Grosfillex Freres, Arbent, Ain, France, a French society
Filed Feb. 6, 1967, Ser. No. 614,233
Claims priority, application France, Feb. 7, 1966, 48,701
6 Claims. (Cl. 297—440)

ABSTRACT OF THE DISCLOSURE

A seat having a supporting frame, a moulded shell of plastic material, at least one releasable, hook-shaped, rearwardly opening attachment means integrally moulded with a front portion of the undersurface of the moulded shell for attachment to a forward transverse member of the frame and at least one resilient clamping means, opening towards the ground, integrally moulded near the back side of the undersurface of the shell for clamping to a rear transverse member of the frame.

---

The present invention relates to improvements in articles made from plastic material which may be assembled very rapidly on a metal framework without bolting, in order to provide a seating assembly including a seat portion and a seat back, constituted by a single plastic shell, which is easily detachable from the frame.

An object of the invention is to provide a seat resulting from the combination of two elements which may be rapidly assembled and disassembled comprising a sheet of plastic material forming a rigid or semi-rigid shell, and a chassis or framework of simple conception formed from metal tubes.

A type of seat is already known which comprises a sheet or plate of moulded plastic material provided on certain portions of its periphery with a relatively resilient tubular edge, split longitudinally, forming an attachment and clamping means, formed during the moulding of said sheet or plate and enabling the latter to be mounted in detachable manner on a seating frame or chassis or piece of furniture provided with legs and having a back supporting portion.

In another known form of seat, the means for assembling the plastic sheet on the frame consist essentially of clamping means situated on the front edge of the plastic sheet, and sleeves disposed in the rear portion, fitting onto truncated uprights provided on the rear region of the framework.

The various constructions described above present the common inconvenience of requiring a relatively heavy and costly metal framework since in the first version, the metal chassis carries a back supporting portion, and the second version is limited to truncated uprights fitted on the rear portion of the framework.

According to the present invention, there is provided a seat of the kind described above but exhibiting various advantages resulting from a new disposition of the fixing means of the rigid shell of plastic material on its framework. Underneath the shell, at the level of the rear edge of the seat, is provided at least one clamping means moulded with the shell, and disposed perpendicularly to the seat, that is to say open towards the ground and having its arms directed towards the ground. In the vicinity of the forward edge of the seat is provided at least one hooking element moulded with the shell and open towards the rear, so that any tendency for it to come away from the frame when the seat is rearwardly tipped is obviated.

These characteristics and advantages, as well as others, will clearly appear from the following description of several embodiments of the invention given merely by way of example with reference to the accompanying drawings in which.

Figure 1:
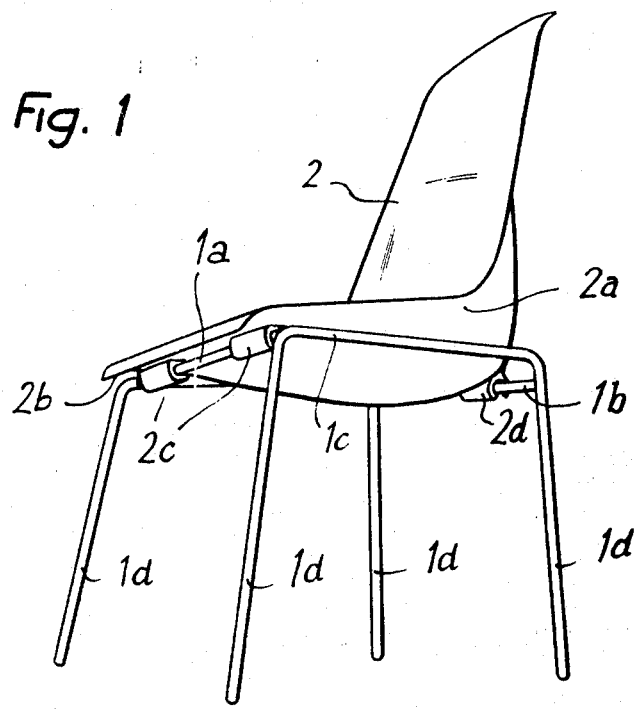
FIGURE 1 is a perspective view of a first embodiment of a shell chair according to the invention.
Figure 2:
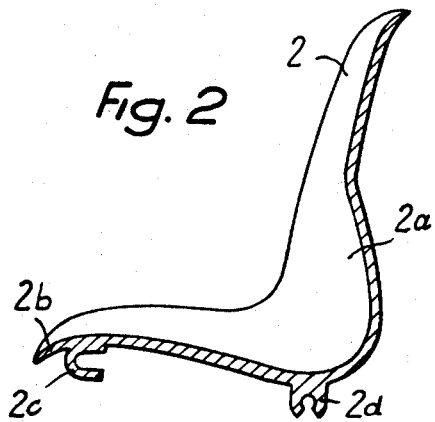
FIGURE 2 is a section of the shell taken in a vertical plane normal to the assembly means at the front and rear of the seat.

The seat shown in FIGURES 1 and 2 is essentially constituted by two independent elements which may be assembled together in detachable manner without bolting or screwing.

One of the elements is constituted by a cair frame or chassis, preferably made from metal tubes, in the form of a horizontal frame formed by two tubes 1a and 1b welded at the vicinity of the horizontal parts 1c to two other welded U-tubes the lower branches 1d of which constitute the legs of the chair. An advantageous configuration of the rear cross member 1b consists in having the form of a V, very widely open, of which the apex is directed towards the ground.

The other element is constituted by a flexible resilient piece of moulded plastic, moulded in the form of a shell 2, having a certain rigidity and forming at the same time the seat and its back.

The concave surface of the shell, moulded in a single piece, has lateral reinforcing side pieces 2a, and has, moreover, towards the front, underneath the portion 2b forming the seat, assembly means 2c formed during moulding with the seat 2b and consisting of elements in the form of hooks, as will be better seen from FIGURE 2, of which the branches are parallel with the seat and the opening is turned towards the rear. Such elements can be clipped onto the front horizontal member 1a of the chassis frame of the seat, or in other words, simply hooked onto the said member.

It will be emphasized that such forward assembly means, thus constituted by simple hooks, do not have any gripping or clamping effect.

Figure 3:
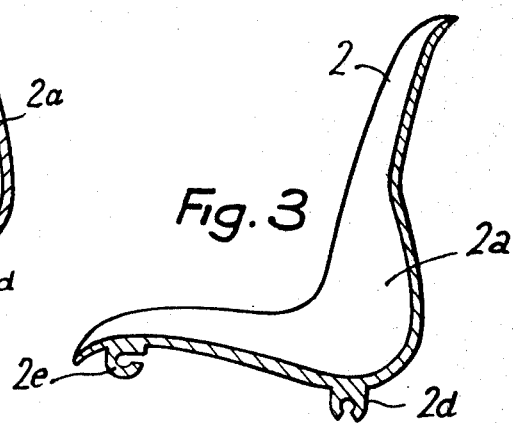
FIGURE 3 is a view similar to FIGURE showing an alternative form of the front assembly means.

Nevertheless, as shown in FIGURE 3, one can use, as an alternative, forward assembly means in the form of resilient clamping members 2e the openings of which are directed towards the rear. In this case, due to the elasticity of the plastic material, the clamping members 2e are pressed by force onto the transverse frame member 1a and thus provide a clamping action on this member.

The upper part of the elements 2c or 2e can form part of the seat 2b itself as shown in FIGURES 2 and 3.

There are also provided on the shell, at the level of the rear edge of the seat, other assembly means 2d consisting of clamping elements having branches disposed perpendicularly to the seat with their openings directed towards the ground, and capable of being resiliently spread so as to pass around the rear horizontal member 1b of the chassis frame of the seat.

The assembly of the seat-back combination with the chassis can be made very rapidly by placing the assembly devices, which are the hooks 2c or the clamping members 2e around the forward horizontal member 1a and thereafter forcing the clamping members 2d around the rear horizontal member 1b. Disassembly is just as rapid by proceeeding in the reverse manner.

This new method of manufacture provides many advantages, which are essentially a lowering of the weight and the price of the metal chassis and a lessening of its bulk, as well as the certainty that the forward attachment members cannot become detached when the back of the seat is accidentally subjected to a heavy load, by virtue of the particular arrangement of these members.

Figure 4:
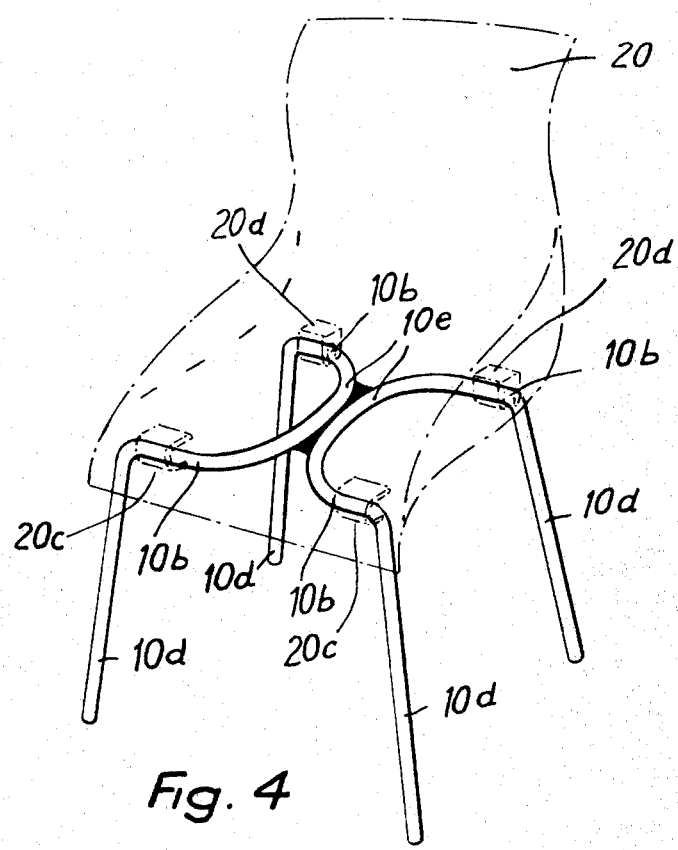
FIGURE 4 is a perspective view of a second embodiment of a shell chair according to the invention.

The advantage with respect to the possible lessening of weight and cost of manufacture of the metal chassis made possible by the invention is shown in FIGURE 4.

The seat shell 20 is shown, in this figure, in dash-dotted lines in order that the construction of the metal chassis may be more easily seen. The latter consists of two pairs of legs 10d each pair being obtained by bending portions of the tubes into two planes at right angles and forming curved portions between the respective pairs of legs of each tube. Thus, each tube includes two lateral legs 10d and includes respectively at the front and the rear a portion 10b parallel to the edge of the seat, as well as a central curved portion 10e directed towards the middle of the seat.

The two portions 10e come together at the centre of the seat and are welded to each other. Two lengths of tube and a single weld thus suffice for making the metallic chassis by virtue of the construction method according to the invention.

The forward portions 10b serve to receive the hooks 20c which are open towards the rear, and the rear portions 10b receive the clamping members 20d open towards the ground, all the devices being rigid with the seat shell 20.

In the embodiments described above, the forward assembly means 2e, 2c or 20c are disposed against the front legs 1d or 10d. Moreover, in FIGURE 3, the rear clamping members 20d are also placed against the rear legs 10d. This arrangement ensures that sideways movement of the seat shell 2 or 20 with respect to the frame is prevented.

According to another embodiment there can be provided, in place of the widely spaced pairs of clamping devices or hooks at the front and rear of the shell 2 a single clamping device or hook extending along the whole width of the transverse tubes 1a, 1b (FIGURE 1).

Figure 5:
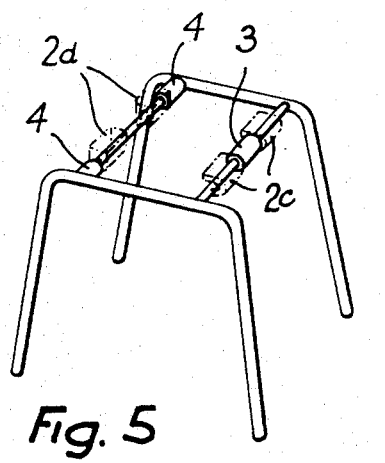
FIGURE 5 is a perspective view of a chair frame according to the invention.
Figure 6:
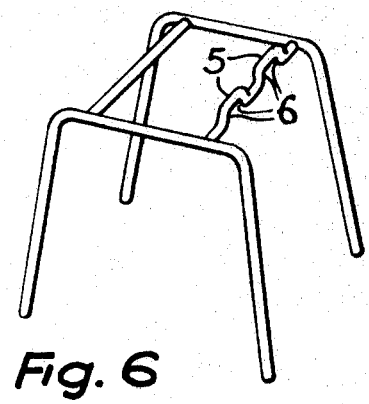
FIGURE 6 is a perspective view of an alternative chair frame according to the invention.

As a further alternative, several separate clamping devices or hooks may be spaced apart and remote from the legs 1d. FIGURES 5 and 6 are examples of embodiments employing this method of assembly of the shell and frame.

In FIGURE 5 there are only shown the hooks 2c and clamping devices 2d forming part of the shell. Prevention of transverse movement of the latter is effected by abutments 3 and 4, which latter are constituted by sleeves which partially or totally surround the transverse tubes on which they are fixed. A single central sleeve 3 or two lateral sleeves 4 can be used.

It is also possible, instead of using sleeves fixed on the tubes, to shape the latter as shown in FIGURE 6 so as to create zones 5, the transverse extent of which corresponds to that of the hooks or clamping means. These zones are limited by two cheeks 6 which act in the same way as the sleeves 3 and 4.

The above description relates to particular embodiments, and it is clear that a great number of variations may be made and that various modifications of form and detail can be effected without departing from the scope of the present invention. In particular, the seat may be made in the form of a long bench, in which the plastic shells are simply fixed on very long parallel bars set in concrete steps or on a concrete frame.

Likewise the structure of the framework can be varied in many ways.

What I claim is:

1. An article of seating furniture comprising a supporting frame having a forward transverse member and a rear transverse member; a moulded shell of plastic material having an undersurface, a forward edge and a back side; at least one releasable hook-shaped attachment means integrally moulded with a front portion of the undersurface of the shell; said attachment means being open toward the back side of said shell and attached to the forward transverse member of the frame; and at least one releasable, resilient clamping means having an opening perpendicular to the undersurface of the shell, integrally moulded with the undersurface of the shell and clamped to the rear transverse member of the frame.

2. The article of claim 1 wherein said frame is formed from a pair of tubes, each tube being bent into two planes at right angles to each other, and having a curved portion and two legs, one leg extending perpendicularly from each end of the curved portion, said curved portions being attached together to form a support for said moulded shell.

3. An article according to claim 1 wherein the frame comprises members of round cross section, and the clamping means are in the form of longitudinally slotted tubular formations of which the opening is normally smaller than the diameter of said frame member, so that a clamping action is produced on the frame members when the clamping members are forced thereon.

4. An article according to claim 3 wherein the releasable attachment means are clamping means similar to the rear clamping means.

5. An article according to claim 3 wherein the frame has abutment means mounted on said transverse frame members to the portions of the frame receiving the attachment and clamping means to prevent transverse movement of the shell.

6. An article according to claim 5 wherein the abutment means are constituted by frame portions disposed perpendicularly to the attachment and clamping means.

References Cited

UNITED STATES PATENTS

| 2,990,007 | 6/1961 | Kessler | 297—440 X |
| 2,997,339 | 8/1961 | Wilson | 297—440 X |
| 3,146,028 | 8/1964 | Grosfillex | 297—440 |

CASMIR A. NUNBERG, *Primary Examiner.*